United States Patent [19]

Cup

[11] Patent Number: 4,793,086
[45] Date of Patent: Dec. 27, 1988

[54] FISHING ROD HOLDER

[76] Inventor: Thomas Cup, 3301-E E. Lake Rd., Livonia, N.Y. 14487

[21] Appl. No.: 103,341

[22] Filed: Oct. 1, 1987

[51] Int. Cl.⁴ ............................................ A01K 97/10
[52] U.S. Cl. .................................................... 43/21.2
[58] Field of Search .................. 43/21.2; 248/520, 521, 248/515

[56] References Cited

U.S. PATENT DOCUMENTS

| | | |
|---|---|---|
| D. 233,036 | 10/1974 | Hoover . |
| D. 271,611 | 11/1983 | Lummis . |
| 1,577,612 | 3/1926 | Dees ................................. 43/21.2 |
| 1,719,695 | 7/1929 | Ferguson . |
| 2,491,008 | 12/1949 | Lake et al. . |
| 2,954,909 | 10/1960 | Miller et al. . |
| 3,724,791 | 4/1973 | Mason ............................... 248/515 |
| 4,485,579 | 12/1984 | Hawie ............................... 43/21.2 |
| 4,495,721 | 1/1985 | Emory ............................... 43/21.2 |
| 4,603,500 | 8/1986 | Harrison ............................ 43/21.2 |
| 4,650,146 | 3/1987 | Duke ................................. 43/21.2 |
| 4,658,534 | 4/1987 | McLean ............................ 43/21.2 |

Primary Examiner—Gene P. Crosby
Attorney, Agent, or Firm—Irving M. Weiner; Joseph P. Carrier; Pamela S. Burt

[57] ABSTRACT

A fishing rod holder for supporting one or a plurality of fishing rods in various adjustable positions. A base member is provided with a vertical post for receiving a desired number of collar support members in vertically stacked and abutting relation. Each collar is provided with an arm which supports a sleeve for receiving a fishing rod. A common locking member is provided at the top of the post to permit simultaneous release of the collars for individual rotational adjustment, or simultaneous locking thereof into desired adjusted positions.

17 Claims, 1 Drawing Sheet

FISHING ROD HOLDER

BACKGROUND OF THE INVENTION

1. Field of the Invention

The present invention relates generally to a fishing rod holder for supporting one or more fishing rods in adjustable predetermined positions on, for example, the gunwale of a boat. More particularly, the invention relates to a fishing rod holder attachable to a horizontal support surface so as to support in stacked relation one or a plurality of fishing rods in a manner which permits selective adjustment of the position of the rod(s), and locking the selected positions of all the rods simultaneously.

2. Description of Relevant Art

Because fishing often entails prolonged holding of a fishing rod, ofttimes for many hours, a number of devices have been developed for supporting the fishing rod for the fisherman. One desirable feature of such devices is that they offer adjustability in the positioning of the rod. Also, because some fishermen prefer to fish with more than one rod at a given time, it is desirable that the fishing rod support device be capable of supporting a plurality of fishing rods simultaneously.

Illustrative of devices for supporting a single fishing rod are those disclosed in U.S. Pat. No. 2,491,008 issued in 1949 to Lake, U.S. Pat. No. 2,954,909 issued in 1960 to Miller et al, and U.S. Pat. No. Des. 233,036 issued in 1974 to Hoover, Jr. However, because such support devices are capable of supporting only a single rod at any given time, they fail to meet the needs of fishermen desiring to fish with a plurality of rods simultaneously.

Illustrative of devices for supporting a plurality of fishing rods simultaneously are those disclosed in U.S. Pat. No. 1,719,695 issued in 1929 to Ferguson and U.S. Pat. No. Des. 271,611 issued in 1983 to Lummis. However, these devices may be deemed relatively deficient inasmuch as the former fails to provide for simultaneous adjustment and locking in place of the fishing rods in their desired positions, and instead employs separate adjustment and locking means for each rod. The latter device, on the other hand, fails to provide for any adjustment of the relative positions of the rods supported thereby.

The present invention overcomes the disadvantages attendant the foregoing known devices by providing an arrangement wherein a plurality of fishing rods are supported in a manner which permits selective individual positioning of the rods, and locking of the rods in their desired positions, by means of a common securing mechanism.

By virtue of its simplified structure, ease of manufacture, versatility and convenience of use, the fishing rod holder according to the present invention represents a considerable improvement over known fishing rod support devices.

SUMMARY OF THE INVENTION

In accordance with the present invention, there is provided a fishing rod holder having a base member adapted to be attached to a support surface, and means for holding a plurality of fishing rods, the holding means being supported on the base member and extending upwardly therefrom. Also provided is means for securing the holding means in adjustable predetermined positions, the securing means operatively cooperating with the holding means so as to simultaneously secure the fishing rods in respective individually-adjusted predetermined positions in a locked state of the securing means, and to permit individual adjustment of each of the fishing rods in a released state of the securing means.

According to a preferred embodiment of the invention, the holding means comprises a plurality of collar members having sleeve members attached thereto, the sleeve members being each adapted to receive a fishing rod therein. The collar members are arranged in vertically stacked and relatively abutting orientation on a post member extending upwardly from the base member. The securing means comprises a knob member adapted to be threadedly received on the upper end of the post member, and to be tightened into a locked state wherein the collar members are clamped between the base member and the knob member, or to be loosened into a released state wherein the collar members may be rotatably adjusted to desired positions.

Preferably, the knob member is removable from the upper end of the post to permit selective placement of a desired number of the collar members on the post member. It is contemplated that in the preferred embodiments of the invention any number of from one to three collar members can be selectively positioned on the post member, thus permitting support of from one to three fishing rods, as desired.

It is an object of the present invention to provide selectivity in the number of fishing rods to be supported at a given time so that, for example, the invention can be readily adapted to accommodate from one to three fishing rods at any given time.

A further object of the invention is to permit individual adjustment of the position of each supported rod, as well as the locking in place of all supported rods, via a common securing arrangement which is simple in structure and convenient to use.

The above and further objects, details and advantages of the present invention will become apparent from the following detailed description of the invention, when read in conjunction with the accompanying drawings.

DETAILED DESCRIPTION OF PREFERRED EMBODIMENTS

Figure 1:
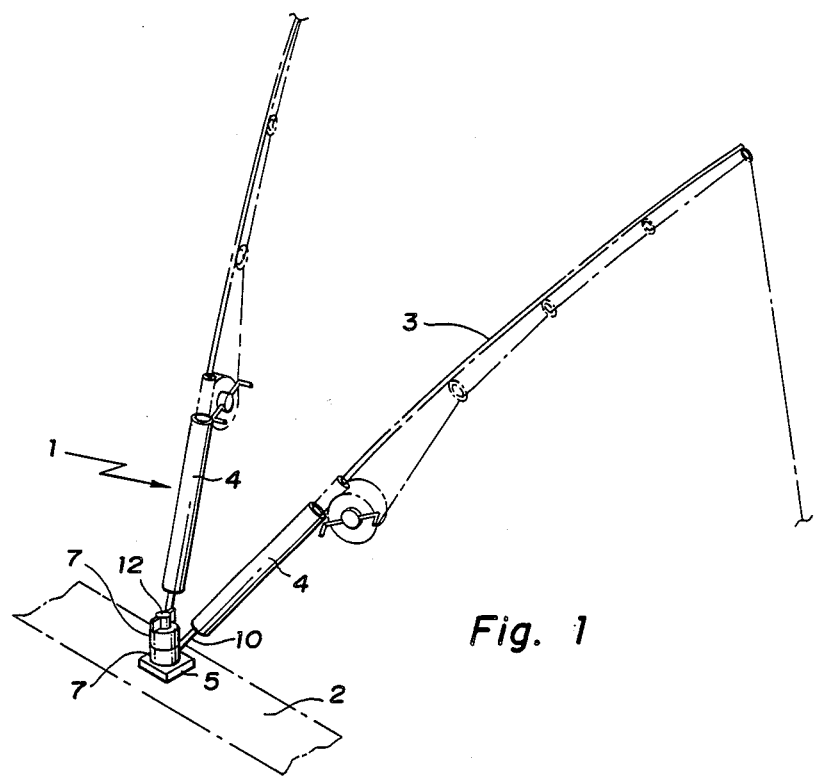
FIG. 1 is a perspective view of an embodiment of the invention permitting simultaneous support of two fishing rods.

With reference to FIG. 1, there is shown a fishing rod holder 1 in accordance with a preferred embodiment of the invention. The fishing rod holder 1 is shown as being secured to a horizontal surface 2 which may comprise, for example, any desired substantially horizontal surface on a boat, such as the gunwale.

Figure 2:
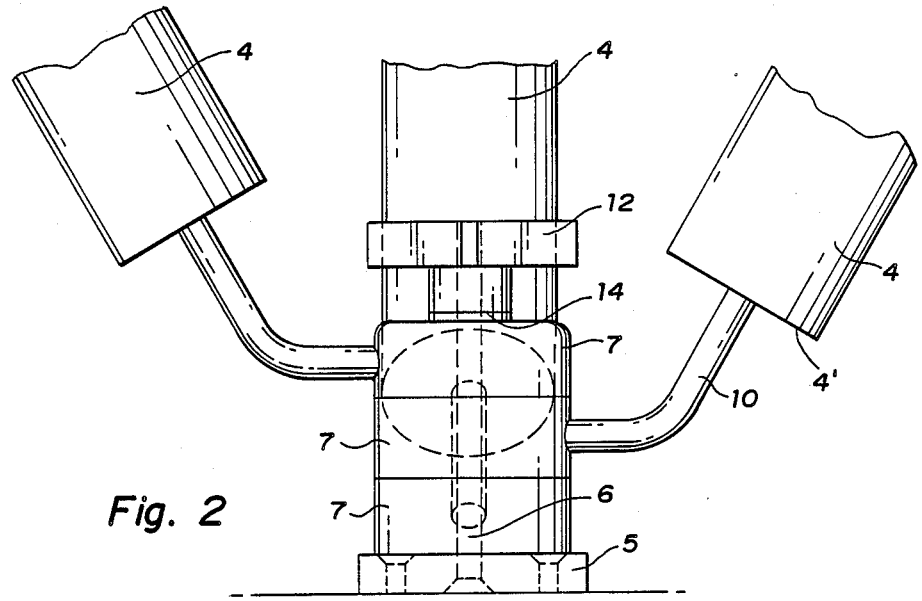
FIG. 2 is a sectional view of the embodiment of FIG. 1, as adapted to support three fishing rods simultaneously.

The FIG. 1 embodiment of the invention is shown as supporting two conventional fishing rods 3 received respectively within two sleeve members 4 of the invention. In contrast, the embodiment of the invention shown in FIG. 2 includes three of the sleeve members 4, and thus will accommodate three of the fishing rods 3. In this respect, it is to be understood that the embodiments of FIGS. 1 and 2 are substantially identical in overall structure, with the exception that three of the sleeves 4 are provided in the FIG. 2 embodiment. Indeed, because the invention is particularly adapted to selectively support either one, two or three fishing rods simultaneously, the FIG. 2 structure comprises the identical structure shown in FIG. 1, with the addition of support means for a third fishing rod. Likewise, where the invention is adapted to accommodate only one rod, the structure would be the same as shown in FIG. 1, with the removal of one fishing rod support means.

As shown most clearly in FIG. 2, the invention further includes a base member 5 which is substantially flat and may preferably be fabricated of stainless steel. The base member 5 is shown as being provided with apertures which receive therein conventional threaded fasteners (such as bolts) which are in turn received through suitable mounting apertures provided in the support surface 2. It is also contemplated that the base member 5 may alternatively be secured to a permanent mounting plate fastened to the support surface 2, thus permitting convenient removal and attachment of base member 5 as desired.

Extending upwardly from a central portion of base 5 is a substantially vertical elongated post member 6. The post 6 may be threaded or otherwise fastened within a suitable central aperture provided in base 5 as shown. The upper end portion of post 6 is threaded to receive the securing means according to the invention, as will be described in detail hereinbelow, and if desired, the post 6 may be threaded along its entire length for convenience of manufacture.

Disposed in vertically stacked relation on post 6 are three collar members 7. The collar members 7 may preferably be fabricated of aluminum, and have central openings therein for slidably receiving post 6 therethrough. Each of the collar members 7 respectively comprise part of the support structure for one of the fishing rods 3, and to this end, only two of the collars 7 are provided in FIG. 1.

Each collar 7 is formed with an aperture in a circumferential portion thereof for receiving one end of an arm 10. The other end of each of the arms 10 is secured to one of the sleeves 4 as will be described below. As shown in FIG. 2, each arm 10 is bent to define an obtuse angle, with a horizontal portion thereof extending outwardly from the aperture in collar 7. As such, the longitudinal axis of each sleeve 4 supported by arm 10 defines an acute angle with respect to the longitudinal axis of post 6.

The sleeves 4 are each adapted to substantially closely receive therein a conventional fishing rod 3, and as shown in FIG. 1, the sleeves 4 having a sufficient length dimension to permit stable support of the fishing rod 3. The lower end 4' of each sleeve 4 is closed, whereas the upper end thereof is open for receiving fishing rod 3.

The attachment of the outer ends of arms 10 to the closed lower ends 4' of respective sleeves 4 may be effected by any desirable means. In one preferred arrangement, an aluminum plug is tightly positioned within the lower end of sleeve 4, and is provided with a central aperture for receiving the outer end of arm 10. The aperture in the plug and the outer end portion of arm 10 may be threaded for mating engagement, or the end of arm 10 can be welded or otherwise secured within the aperture.

When the collars 7 are in their vertically-stacked and relatively abutting orientation resting on base 5 around post 6 as shown in FIGS. 1 and 2, the sleeves 4 for receiving fishing rods 3 branch out upwardly and outwardly therefrom. Adjustment of the position of sleeves 4 (and in turn the fishing rods 3) is effected by rotation of collars 7 relative to post 6. It will be understood that the positions of the fishing rods are adjustable in horizontal planes extending a full 360° around post 6.

The securing means which permits the foregoing selective rotatable adjustment of collars 7, or alternatively the locking of collars 7 at predetermined positions, comprises a knob 12 which is threadedly received on the upper threaded end portion of post 6. Preferably, knob 12 is fabricated of a rigid plastic material, with a threaded brass insert for cooperating with post 6. The knob 12 is adapted to be manually threaded on post 6 to effect the above-mentioned selective locking function as follows.

A compression washer 14 is seated on the upper surface of the uppermost collar 7 as shown in FIG. 2, and to this end the upper collar 7 may be formed with a mating seat surface for receiving washer 14. The knob 12 is then threadedly attached to the upper end of post 6, and as the knob 12 is turned in a clockwise direction so as to be downwardly threaded along post 6, the lower surface of knob 12 will come to bear against washer 14. The knob 12 is tightened until the washer 14 is compressed and the downward force exerted on the stack of collars 7 against base 5 is sufficient to lock collars 7 against rotation. In this condition, the securing means is in its locked state.

When it is desired to re-position one or more of the fishing rods 3, the user has merely to turn knob 12 in the counterclockwise direction so that it is threadedly moved upwardly along post 6 to release the downward force acting on the collars 7. Once this has been accomplished, the user is free to adjust any given one(s) or all of the fishing rods 3 merely by rotating the collar(s) 7 about shaft 6. When the collar(s) 7 have been thus adjusted with the fishing rods 3 moved to their new positions, a simple clockwise turning of knob 12 to its locked position will simultaneously lock all of the collars 7 in their new position(s).

By virtue of the arrangement of knob 12 on the upper end of post 6, as well as the stacked abutting arrangement of collars 7 on base 5, re-positioning of any one or all of the fishing rods 3 is permitted by the simple operation of turning knob 12. Conversely, locking of all the collars 7 is also easily effected by turning knob 12 in the opposite direction to simultaneously lock all the collars 7 in their adjusted positions.

It will also be understood that by simply removing knob 12 and washer 14 from the upper end of post 6, the user is free to adapt the invention to accommodate different numbers of fishing rods merely by adding or removing a selected number of collars 7 on post 6. In this respect, it is of course possible to simply leave three of the collars in position on post 6 and use only the desired number of the sleeves 4. However, where, for example, a user has purchased a fishing rod holder according to the invention for accommodating only one or two fishing rods (i.e., with only one or two collars 7 with attached arms 10 and sleeves 4), he can if desired purchase additional collars 7 (with arms 10 and sleeves 4) when it is desired to support more fishing rods.

It is also contemplated that the invention can be provided in kit form so as to include three (or even more) of the collars 7 with arms 10 and sleeves 4, and the user is free to select the number of collar arrangements he desires, with later alterations in the number being readily accomplished merely by adding or removing the collar arrangements from post 6.

While there has been described what are at present considered to be the preferred embodiments of the invention, it is to be understood that various modifications may be made therein without departing from the spirit or scope of the invention. The above embodiments are to be considered as illustrative, and not restrictive. The scope of the invention is not to be restricted to the foregoing description, and rather is indicated by the appended claims.

I claim:

1. A fishing rod holder, comprising:
   a base member for supporting said fishing rod holder on a support surface;
   means for holding a plurality of fishing rods, said holding means being supported on said base member and extending upwardly therefrom; and
   means for securing said holding means in adjustable predetermined positions, said securing means operatively cooperating with said holding means so as to simultaneously secure said fishing rods in respective individually-adjusted predetermined positions in a locked state of said securing means, and to permit individual adjustment of each of said fishing rods in a released state of said securing means; said holding means comprises a plurality of sleeve members each adapted to receive a fishing rod therein, and a plurality of support members for respectively supporting said sleeve members;
   said support members being arranged in stacked relation on said base member so as to be individually rotatable relative thereto; and
   said securing means is adapted to lock said support members against rotation in said locked state.

2. A fishing rod holder according to claim 1, wherein:
   said support members of said holding means each comprise a collar member having a central opening formed therein;
   an elongated post member is secured to said base member so as to extend upwardly therefrom and through said central openings of said collar members; and
   said collar members are rotatable relative to said post member when said securing means is in said released state, and are secured against rotation relative to said post member when said securing means is in said locked state.

3. A fishing rod holder according to claim 2, wherein said post member is threaded along at least an upper portion thereof;
   said securing means comprises a knob member adapted to threadedly engage said upper threaded portion of said post member; and
   said knob member is adapted to be downwardly tightened on said post member into said locked state whereby said collar members are clamped against rotation between said base member and said knob member, and to be upwardly loosened on said post member whereby said collar members are permitted to be rotatably adjusted to said predetermined positions.

4. A fishing rod holder according to claim 3, wherein:
   a compression washer is disposed around said post member so as to abut against an upper surface of an uppermost one of said collar members; and
   said knob member compressibly engages said washer in said locked state.

5. A fishing rod holder according to claim 2, wherein said sleeve members are each respectively attached to one of said collar members by a bent arm; and
   each of said sleeve members has a closed lower end attached to one of said bent arms and an open upper end for receiving a fishing rod.

6. A fishing rod holder according to claim 5, wherein:
   said base member is adapted to be attached to a substantially horizontal support surface;
   said post member extends substantially vertically upwardly from a central portion of said base member; and
   said collar members are vertically stacked in abutting relation on said post member.

7. A fishing rod holder according to claim 6, wherein:
   each said collar member is provided with a side aperture extending through a circumferential portion thereof; and
   a first end of each of said arms is secured within a side aperture of a respective one of said collar members, and a second end of each of said arms is respectively secured to said closed lower end of one of said sleeve members.

8. A fishing rod holder according to claim 7, wherein:
   each of said arms is bent to define an obtuse angle, such that each of said sleeve members is supported so as to define an acute angle with said substantially vertical post member.

9. A fishing rod holder according to claim 2, wherein:
   said base member is fabricated of stainless steel, and is provided with apertures for receiving threaded fastening members for securing said base member to a support surface on a boat; and
   said collar members are fabricated of aluminum.

10. A fishing rod holder, comprising:
    a base member for supporting said fishing rod holder on a support surface;
    an elongated post member secured to said base member so as to extend upwardly therefrom;
    at least one collar member having a central opening for receiving said post member therethrough, said collar member abutting against and being supported on said base member, around said post member;
    said collar member having a fishing rod support member attached thereto;
    said collar member being adapted to selectively support additional ones of said collar members in stacked and abutting relation thereon on said post member; and
    means for securing said at least one collar member in an adjustable predetermined position in a locked state of said securing means, and for permitting rotational adjustment of said collar member relative to said post member in a released state of said securing means.

11. A fishing rod holder according to claim 10, wherein:
    two of said collar members are disposed in stacked relation on said post member; and
    said securing means operatively cooperates with an upper end portion of said post member.

12. A fishing rod holder according to claim 10, wherein:
    three of said collar members are disposed in stacked relation on said post member; and
    said securing means operatively cooperates with an upper end portion of said post member.

13. A fishing rod holder according to claim 10, wherein:
   said fishing rod support member comprises a sleeve member having a closed lower end and an open upper end for receiving a fishing rod; and
   said sleeve member is attached to said collar member by a bent arm.

14. A fishing rod holder according to claim 13, wherein:
   said base member is adapted to be attached to a substantially horizontal support surface;
   said post member extends substantially vertically upwardly from a central portion of said base member; and
   said arm is bent to define an obtuse angle, such that said sleeve member is supported so as to define an acute angle with said substantially vertical post member.

15. A fishing rod holder according to claim 10, wherein:
   said post member is threaded along at least an upper portion thereof;
   said securing means comprises a knob member adapted to threadedly engage said upper threaded portion of said post member; and
   said knob member is adapted to be downwardly tightened on said post member into said locked state whereby said collar member is clamped against rotation between said base member and said knob member, and to be upwardly loosened on said post member whereby said collar member is permitted to be rotatably adjusted to said predetermined position.

16. A fishing rod holder, comprising:
   a base member for supporting said fishing rod holder on a horizontal support surface;
   an elongated post member secured to said base member so as to extend substantially vertically upwardly therefrom;
   a plurality of collar members having a central opening for receiving said post member therethrough, said collar members being adapted to be selectively received on said post member so as to be supported in vertically stacked relation on said base member;
   each said collar member having a fishing rod support member attached thereto;
   said fishing rod holder being adapted to selectively support a single fishing rod or a plurality of fishing rods by selective placement of a single one of said collar members or a plurality of said collar members on said post member;
   securing means operatively cooperating with an upper end of said post member and adjustable between a locked state wherein said collar member(s) are secured in adjustable predetermined position(s), and a released state wherein said collar member(s) are rotatably adjustable; and
   said securing means being removable from said upper end of said post member to permit said selective placement of said collar members on said post member.

17. A fishing rod holder according to claim 16, wherein:
   said upper end of said post member is threaded; and
   said securing means comprises a knob member adapted to be downwardly tightened on said post member into said locked state whereby said collar member(s) is clamped against rotation between said base member and said knob member, to be upwardly loosened on said post member whereby said collar member(s) is permitted to be rotatably adjusted to said predetermined position, and to be removed from said post member whereby said collar member(s) may be selectively placed on said post member.

* * * * *